Sept. 12, 1950 I. E. GROSDOFF 2,521,788

ELECTRONIC COUNTER

Filed March 1, 1945 3 Sheets-Sheet 1

INVENTOR.
IGOR E. GROSDOFF
BY C. D. Tuska
ATTORNEY

Sept. 12, 1950 I. E. GROSDOFF 2,521,788

ELECTRONIC COUNTER

Filed March 1, 1945 3 Sheets-Sheet 2

INVENTOR.
IGOR E. GROSDOFF
BY
ATTORNEY

INVENTOR.
IGOR E. GROSDOFF
BY C. D. Tuska
ATTORNEY

Patented Sept. 12, 1950

2,521,788

UNITED STATES PATENT OFFICE 2,521,788

ELECTRONIC COUNTER

Igor E. Grosdoff, Princeton, N. J., assignor to Radio Corporation of America, a corporation of Delaware Application March 1, 1945, Serial No. 580,446

10 Claims. (Cl. 235—92)

This invention relates to electronic counters having a cycle of operation which is completed in response to the application of a predetermined number of electrical impulses, and has for its principal object the provision of an improved counter and method of operation whereby the construction and operation of such counters are simplified and improved.

The counter of the present invention is similar to that of a copending application of Flory, Serial No. 467,032, filed November 26, 1942, now Patent No. 2,410,156, in that it includes a plurality of multivibrator units which are connected in cascade and have the last multivibrator unit interconnected with an intermediate multivibrator unit for causing the counter to complete its cycle of operation in response to a number of electrical pulses other than that required to complete such cycle of operation when all the units are connected in a loop.

While the counter of the aforesaid Flory application is satisfactory for continuous operation, the fact that it must be completely filled once before it begins to count correctly involves some difficulty in cases where the counter is frequently started and stopped and the counter is required to afford a correct indication under these conditions. In accordance with the present invention, this difficulty is avoided by so interconnecting the various multivibrator units that no preliminary filling of the counter is required to make it complete its cycle of operation in response to the desired number of electrical impulses.

The illustrated form of the invention includes four multivibrator units so interconnected as to complete their cycle of operation in responses to the application of ten electrical impulses and to properly indicate or register the accumulated count at any point in the cycle. These connections are such that the various units are turned over in the usual manner in response to the number of impulses required to turn over all the units once. When the last unit is turned over, however, there is applied to the grids of the second and third units a negative potential which causes these units to be skipped during the rest of the operating cycle of the counter. This negative potential is applied from one anode of the last unit through a coupling capacitor and a duodiode. Output pulses at one tenth the frequency of the input pulses are derived from the other anode of the last unit.

Important objects of the invention are the provision of an improved counter of the feed-back type which requires no preliminary adjustment, other than resetting, for successive operational periods; the provision of an improved counter which is of relatively simple construction; and an improved method of indicating electrical impulses in groups of ten or the like.

The invention will be better understood from the following description considered in connection with the accompanying drawing and its scope is indicated by the appended claims.

Referring to the drawings.

Figure 1:
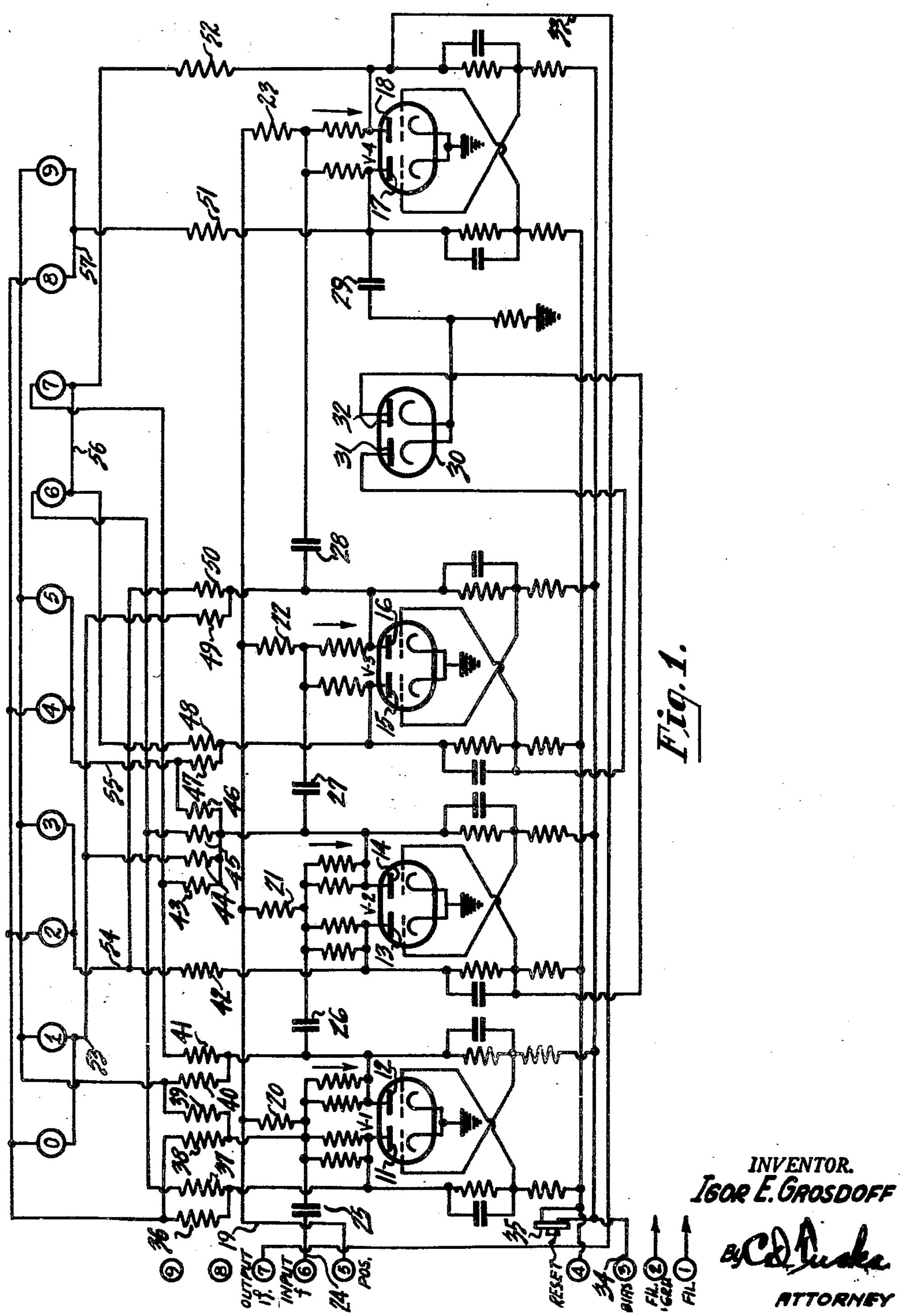
Fig. 1 is a wiring diagram of one form of the improved counter.

In this figure, the four multivibrators are indicated by the reference numerals V—1, V—2, V—3 and V—4. These various units have anodes 11 and 12, 13 and 14, 15 and 16, and 17 and 18 respectively. As is well known, current flows through only one anode of each pair at a time. Current is transferred from one anode of the pair to another (1) in response to the application of a negative pulse to the grid of an anode which is conducting, (2) in response to the application of a positive pulse to the grid of an anode which is not conducting or (3) in response to the application of a negative pulse to the common anode terminal of the unit.

Potential for operating the units is applied from a lead 19 to the common anode leads of the units through resistors 20, 21, 22 and 23 respectively. Between the common anode lead and each anode of each unit is connected impedance means shown as parallel connected resistors which, in each case, may be replaced by a single resistor.

The impulses to be counted are applied through a lead 24 and a capacitor 25 to the common anode terminal of the unit V—1. The anode 12 of the unit V—1 is coupled through a capacitor 26 to the common anode terminal of the unit V—2. Similarly the anode 14 of the unit V—2 is coupled through a capacitor 27 to the common anode terminal of the unit V—3, and the anode 16 of the unit V—3 is coupled through a capacitor 28 to the common anode terminal of the unit V—4. Output pulses at a frequency one tenth that of the applied pulses is derived from the anode 18 of the unit V—4 through a lead 33.

The anode 17 of the unit V—4 is coupled through a capacitor 29 to the anodes of a duo-diode 30. One anode 31 of the duo-diode 30 is connected to the right hand grid of the unit V—3. The other anode 32 of this duo-diode is connected to the right hand grid of the unit V—2. As hereinafter more fully explained, the function of the duo-diode 30 is to prevent the signal from the preceding units V—2 and V—3 from being fed into the unit V—4 so that the units V—2 and V—3 are prevented from operating during a certain stage of the operation.

Negative bias potential is applied to the grids of the various units through a lead 34 and a reset switch 35 is opened and closed to establish a standby condition with current in the various units as indicated by the arrows.

The cycle of operation is indicated by the following chart wherein the pulse numbers are tabulated in the first column and the position of current in the various units are indicated by arrows in the following columns. For example the chart shows that the second pulse functions to transfer current to the right hand side of the unit V—1 and to the left hand side of the unit V—2 but does not affect the currents of the units V—3 and V—4.

| Pulse No. | Unit No. | | | | | | | |
|---|---|---|---|---|---|---|---|---|
| | V—1 | | V—2 | | V—3 | | V—4 | |
| | 11 | 12 | 13 | 14 | 15 | 16 | 17 | 18 |
| 0 | | ↓ | | │ | | │ | | │ |
| 1 | ↓ | | | ↓ | | │ | | │ |
| 2 | | ↓ | │ | | | │ | | │ |
| 3 | ↓ | | ↓ | | | ↓ | | │ |
| 4 | | ↓ | | │ | │ | | | │ |
| 5 | ↓ | | | ↓ | │ | | | │ |
| 6 | | ↓ | │ | | │ | | | │ |
| 7 | ↓ | | │ | | │ | | | ↓ |
| 8 | | ↓ | │ | [1] ↓ | │ | [1] ↓ | [2] │ | |
| 9 | ↓ | | ↓ | | ↓ | | ↓ | |
| 0–10 | | ↓ | | ↓ | | ↓ | | ↓ |

[1] Transmitted pulse.
[2] Feed back takes place.

It will be observed that the operation of the counter is normal up to the application of the seventh pulse. In the absence of the duo-diode connection, the response to a count of eight would be a transfer of current from the left to the right sides of all the units. The negative potential of the anode 17, however, functions through the duo-diode 30 to prevent the right hand grids of the units V—2 and V—3 from becoming positive so that the currents of these units are not transferred. Thus only the units V—1 and V—4, have their currents transferred in response to the eighth count. The ninth count only transfers current to the left hand side of the unit V—1. The tenth count transfers current to the right hand sides of all the units and causes a negative output pulse to be delivered at the terminal 33. Thereafter, the same cycle of operation is repeated so long as negative pulses are applied to the input terminal 24.

The count indicating system includes lamps 0 and 1 to 9 and resistors 36 to 52 which are connected between the lamps and various points of the units V—1, V—2, V—3 and V—4. This network applies potential to the lamps in such a way that only one lamp corresponding to the count is lit at any given time. This is accomplished by connecting the lamps in pairs through parts of the resistor network to such points of the multivibrator units as provide the resultant voltages required for lighting the lamps or providing indications in the correct order.

Thus the lamps 0 and 1 have their common terminal 53 connected to the anode 14 through the resistor 44 and to the anode 16 through the resistor 49. The individual terminals of the lamps 0, 2, 4 and 8 are connected to the anode 11 through the resistor 36 and to the common anode terminal of the unit V—1 through the resistor 38. Similarly the individual terminal of the lamps 1, 3, 5 and 9 are connected to the anode 12 through the resistor 40 and to the common anode terminal of the unit V—1 through the resistor 39. The common terminal 54 of the lamps 2 and 3 is connected through the resistor 42 to the anode 13 and through the resistor 50 to the anode 16; the common terminal 55 of the lamps 4 and 5 is connected through the resistor 46 to the anode 14 and through the resistor 49 to the anode 15; the common terminal 56 of the lamps 6 and 7 is connected through the resistor 48 to the anode 15 and through the resistor 52 to the anode 18; and the common terminal 57 of the lamps 8 and 9 is connected through the resistor 51 to the anode 17.

Assuming that each of the anodes 11 to 18 have a potential E when they do not draw current and a potential of $E_0$, when they do draw current, it is apparent that the common terminals 53 to 57 may be at any one of three potentials $E_2$, E, or ½E. For example, the common terminal 53 of the lamps 0 and 1 has a potential of E when neither of the anodes 14 and 16 are taking current, of $E_0$, when both anodes 14 and 16 are taking current and of ½E when only one of the anodes 14 and 16 are taking current.

With the exception of those of lamps 6 and 7, the individual lamp terminals are connected across one or the other pair of anode resistors of the unit V—1 so that the potentials of these terminals have a value of E, or ½E depending on which anode of the V—1 is conducting current. The individual terminal of lamp 6 is connected through the resistor 37 to the anode 11 and through the resistor 45 to the anode 14. The individual terminal of the lamp 7 is connected through the resistor 41 to the anode 12 and through the resistor 43 to the anode 14. With these connections, the potentials of the individual leads of the lamps 6 and 7 change between $E_0$, E and ½E or in the same way as the potentials of the common terminals of these lamps. This is made necessary by the fact that the common terminal of the lamps 6 and 7 may be at zero potential for the counts of 4, 5, 6 and 7 and the lamps 6 and 7 would also indicate a count of 4 and 5 if they were connected to the unit V—1 in the same way as the other lamps.

Each of the various lamps is lit only when it is subjected to the voltage $E_1=E-E_0$, i. e. difference between potential at the plates of a multivibrator when at standstill. How the voltages of the different lamps vary as the count proceeds is shown by the following tabulation:

| Pulse No. | Lamp No. 0 | 1 | 2 | 3 | 4 | 5 | 6 | 7 | 8 | 9 |
|---|---|---|---|---|---|---|---|---|---|---|
| 0 | E, $E_0$, $E_L$ | ½E, $E_0$, ½E | E, ½E, ½E | ½E, ½E, O | E, ½E, ½E | ½E, ½E, O | ½E, ½E, O | $E_0$, ½E, ½E | E, E, O | ½E, E, ½E |
| 1 | ½E, $E_0$, ½E | E, $E_0$, $E_L$ | ½E, ½E, O | E, ½E, ½E | ½E, ½E, O | E, ½E, ½E | $E_0$, ½E, ½E | ½E, ½E, O | ½E, E, ½E | E, E, O |
| 2 | E, ½E, ½E | ½E, ½E, O | E, $E_0$, $E_L$ | ½E, $E_0$, ½E | E, E, O | ½E, E, ½E | E, ½E, ½E | ½E, ½E, O | E, E, O | ½E, E, ½E |
| 3 | ½E, ½E, O | E, ½E, ½E | ½E, $E_0$, ½E | E, $E_0$, $E_L$ | ½E, E, ½E | E, E, O | ½E, ½E, O | E, ½E, ½E | ½E, E, ½E | E, E, O |
| 4 | E, ½E, ½E | ½E, ½E, O | E, E, O | ½E, E, ½E | E, $E_0$, $E_L$ | ½E, $E_0$, ½E | ½E, $E_0$, ½E | $E_0$, $E_0$, O | E, E, O | ½E, E, ½E |
| 5 | ½E, ½E, O | E, ½E, ½E | ½E, E, ½E | E, E, O | ½E, $E_0$, ½E | E, $E_0$, $E_L$ | $E_0$, $E_0$, O | ½E, $E_0$, ½E | ½E, E, ½E | E, E, O |
| 6 | E, E, O | ½E, E, ½E | E, ½E, ½E | ½E, ½E, O | E, ½E, ½E | ½E, ½E, O | E, $E_0$, $E_L$ | ½E, $E_0$, ½E | E, E, O | ½E, E, ½E |
| 7 | ½E, E, ½E | E, E, O | ½E, ½E, O | E, ½E, ½E | ½E, ½E, O | E, ½E, ½E | ½E, $E_0$, ½E | E, $E_0$, $E_L$ | ½E, E, ½E | E, E, O |
| 8 | E, E, O | ½E, E, ½E | E, ½E, ½E | ½E, ½E, O | E, ½E, ½E | ½E, ½E, O | E, ½E, ½E | $E_0$, ½E, ½E | E, $E_0$, $E_L$ | ½E, $E_0$, ½E |
| 9 | ½E, E, ½E | E, E, O | ½E, ½E, O | E, ½E, ½E | ½E, ½E, O | E, ½E, ½E | ½E, ½E, O | E, ½E, ½E | ½E, $E_0$, ½E | E, $E_0$, $E_L$ |

NOTE:

In each block [a above b, c at right] (entries given above as a, b, c):

a is the potential applied to the top of lamps;
b is the potential applied to the bottom of lamps or to the common connection of groups of two's: 0—1, 2—3, 4—5, 6—7, and 8—9;
c is the net potential across the lamps.

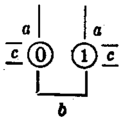

When
$E_L=E-E_0$ the indication is taking place.
$E$ is the potential at a plate which does not draw current.
$E_0$ is the potential at a plate which draws current.

Figure 2:
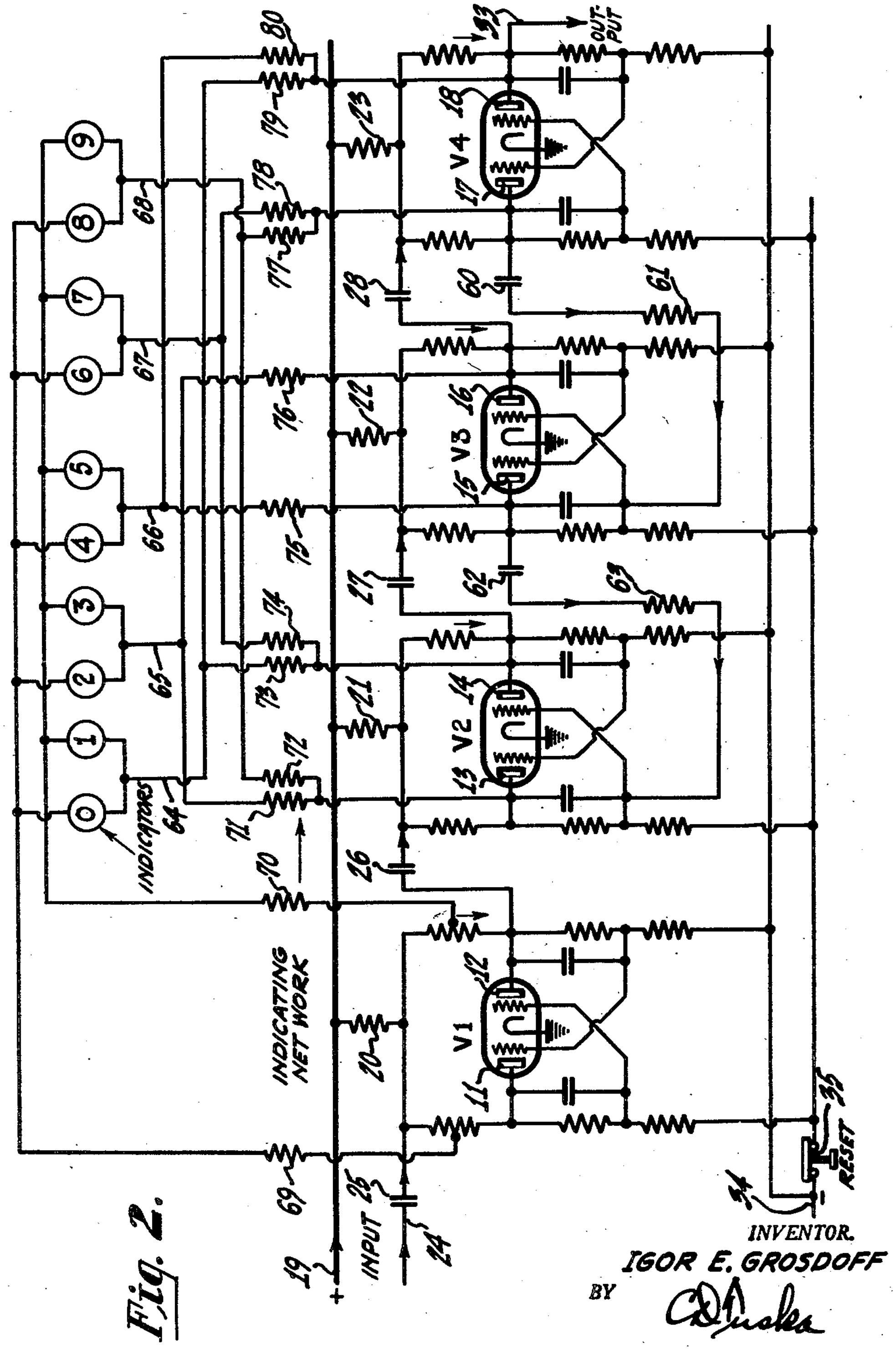
Fig. 2 is a wiring diagram of a preferred form of the improved counter.

The circuit of Fig. 2 is similar to that of Fig. 1 in most respects but differs therefrom in that (1) the feed-back is from the unit V—4 through a capacitor 60 and a resistor 61 to the unit V—3 and from the unit V—3 through a capacitor 62 and resistor 63 to the unit V—2 instead of from the unit V—4 through the capacitor 29 and the duo-diode 30 to the units V—2 and V—3, and (2) the indicating network 36 to 62 is replaced by a simpler indicating network 69 to 80.

Under these conditions, feed-back between the units V—4 and V—3 and between the units V—3 and V—2 occur at different times so that the use of an indicating network which is simpler and provides a higher voltage at the indicators 0 and 1 to 9 is made possible. Another advantage of the circuit of Fig. 2 is that the use of the feed-back duo-diode 30 of Fig. 1 is avoided.

It will be noted that the individual terminals of the indicators 0, 2, 4, 6 and 8 are connected through a resistor 69 to a lead of the resistor of the anode 11 of the unit V—1 and that the individual terminals of the indicators 1, 3, 5, 7 and 9 are connected through a resistor 70 to a lead of the resistor of the anode 12 of the unit V—1. With these connections, the individual terminals of the indicators 0, 2, 4, 6 and 8 are more negative when the anode 11 is conducting and more positive when the anode 11 is not conducting. Similarly the individual terminals of the indicators 1, 3, 5, 7 and 9 are more negative when the anode 12 is conducting and more positive when this anode is not conducting.

By opening and closing the reset switch 35, there is established a standby condition with current flowing through the anodes 12, 14, 16 and 18 as indicated by the arrows.

Figure 3:
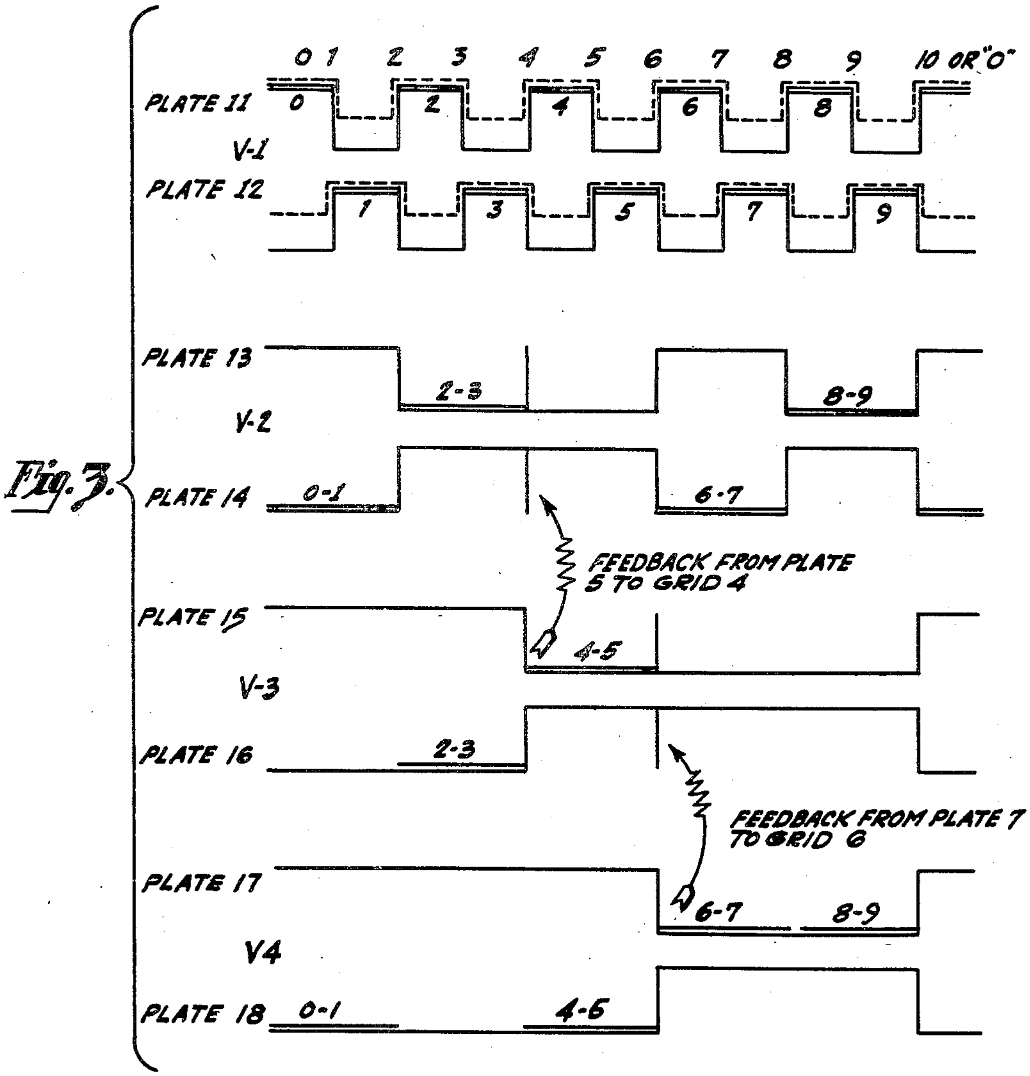
Fig. 3 is an explanatory diagram relating to the operation of the circuit of Fig. 2.

The condition of the circuit of Fig. 2 at the various stages of its operating cycle is shown by Fig. 3 wherein the input impulse number is shown in the first line at the top and the voltage condition of the anodes 11 to 18 at each of the pulses is shown by the curve to the right of the corresponding anode numeral.

Thus with current in the various units as indicated by the arrows, the 0 pulse leaves the anodes 11, 13, 15 and 17 at a more positive potential and the anodes 12, 14, 16 and 18 at a more negative potential. Under these conditions, the line 64 is at a more negative potential because anodes 14 and 18 are conducting the lead 65 is at a less negative potential because the anode 13 is not conducting, the lead 66 is at a less negative potential because the anode 15 is not conducting, the lead 67 is at a less negative potential because the anode 17 is not conducting and the lead 68 is still less negative because neither the anode 13 nor the anode 17 is conducting. At the same time, the individual leads of the indicators 1, 3, 5, 7 and 9 are more negative because they are connected to the anode 12 which is conducting, and the individual leads of the indicators 0, 2, 4, 6 and 8 are more positive because they are connected to the anode 11 which is not conducting. It therefore follows that the indicator 0 is the only one of the indicators which has the maximum voltage applied to its terminals.

The only effect of the 1 pulse is to shift current from the anode 12 to the anode 11. This extinguishes the indicator 0 and lights the indicator 1 which is connected to the conducting anodes 14 and 18. All the other indicators are connected to one conducting and one non-conducting anode and are not lighted.

The effect of the 2 pulse is to shift current from the anode 11 to the anode 12 and from the anode 14 to the anode 13 so that the lead 65 is now the only lead connected to two conducting anodes. The indicator 2 is therefore lighted.

The only effect of the 3 pulse is to shift current from the anode 12 to the anode 11 and to light the indicator 3 which together with the indicator 2 is connected to the conducting anodes 13 and 16.

The effect of the 4 pulse is to shift current from the anode 11 to the anode 12, from the anode 13 to the anode 14, from the anode 16 to the anode 15 and (due to the feed-back 62—63) from the anode 14 back to the anode 13 so that only the anodes 12, 13, 15 and 18 are conducting. Under these conditions, the lead 66 is the only one connected to two conducting anodes and the indicator 4 is lighted.

The only effect of the 5 pulse is to shift current from the anode 12 to the anode 11 thus lighting the indicator 5.

The effect of the 6 pulse is to shift current from the anode 11 to the anode 12, from the anode 13 to the anode 14, from the anode 15 to the anode 16, from the anode 18 to the anode 17, and (due to the feed-back 60—61) from the anode 16 back to the anode 15 so that only the anodes 12, 14, 15 and 17 are conducting. Under these conditions, the lead 67 is the only one connected to two conducting anodes and the indicator 6 is lighted.

The effect of the 7 pulse is to shift current from the anode 12 to the anode 11 thereby lighting the indicator 7.

The effect of the 8 pulse is to shift current from the anode 11 to the anode 12 and from the anode 14 to the anode 13 so that only the anodes 12, 13, 15 and 17 are conducting. Under these conditions, the lead 68 is the only one connected to two conducting anodes (13 and 17) and the indicator 8 is lighted.

The effect of the 9 pulse is to shift current from the anode 12 to the anode 11 thereby lighting the indicator 9.

The effect of the 10 pulse is to restore the original standby condition so that only the anodes 12, 14, 16 and 18 are conducting.

These various steps are shown diagrammatically by the following tabulation which is self-explanatory.

| Pulse | V—1 | | V—2 | | V—3 | | V—4 | |
|---|---|---|---|---|---|---|---|---|
| | 11 | 12 | 13 | 14 | 15 | 16 | 17 | 18 |
| 0 | | ↓ | | ↓ | | ↓ | | ↓ |
| 1 | ↓ | | | ↓ | | ↓ | | ↓ |
| 2 | | ↓ | ↓ | | | ↓ | | ↓ |
| 3 | ↓ | | ↓ | | | ↓ | | ↓ |
| 4 | | ↓ | ↓ | [1] ↓ | ↓ | | | ↓ |
| 5 | ↓ | | ↓ | | ↓ | | | ↓ |
| 6 | | ↓ | | ↓ | ↓ | [1] ↓ | ↓ | |
| 7 | ↓ | | | ↓ | ↓ | | ↓ | |
| 8 | | ↓ | ↓ | | ↓ | | ↓ | |
| 9 | ↓ | | ↓ | | ↓ | | ↓ | |
| 10 | | ↓ | | ↓ | | ↓ | | ↓ |

[1] Transmitted pulse.

While correct lighting of the lamps may be attained with other combinations of resistors, it is believed that the combination illustrated is the most economical of parts and is otherwise preferable in that it provides a relatively wide swing of voltage across the lamps so that they are very effectively lighted and extinguished. As previously indicated, the counter itself also has the advantage of economy of parts and simplicity of operation.

What is claimed is:

1. The combination of four trigger circuit units, means connecting said trigger circuit units in cascade to provide operation of each of said units except the first by an immediately preceding unit in said cascade connection, means coupled the first of said units for applying voltage pulses to the first of said units, and feed-back connections between the third and second and between the fourth and third of said units for establishing a cycle of operation such that one pulse is delivered by the fourth of said units in response to ten of said pulses.

2. The combination of four trigger circuit units, means connecting said trigger circuit units in cascade to provide operation of each of said units except the first by an immediately preceding unit in said cascade connection, means coupled to the first of said units for applying voltage pulses to the first of said units, and feed-back connections between the fourth and the second and third of said units for establishing a cycle of operation such that one pulse is delivered by the fourth of said units in response to ten of said pulses.

3. The combination of a plurality of trigger circuit units, means connecting said trigger circuit units in cascade to provide operation of each of said units except the first by an immediately preceding unit in said cascade connection, means coupled to the first of said units for applying voltage pulses to the first of said units, and means including a duo-diode connected between an anode of the last of said units and certain control grids of a preceding pair of said units for rendering said pair of units unresponsive to a pulse immediately following a pulse by which current is transferred from one to another of the anodes of said last unit.

4. The combination of four trigger circuit units, means connecting said trigger circuit units in cascade to provide operation of each of said units except the first by an immediately preceding unit in said cascade connection, means coupled to the first of said units for applying voltage pulses to the first of said units, and means connected between the last and the second and third of said units for rendering said second and third units unresponsive to a pulse immediately following a pulse by which current is transferred in one direction between the anodes of said last unit.

5. The combination of a plurality of trigger circuit units each including a pair of electron discharge elements having anode, cathode and grid electrodes, the grids and anodes of each pair of electron discharge elements being cross-connected, means connecting said units in cascade to provide operation of each of said units except the first by an immediately preceding unit, means coupled to the first of said units for applying voltage pulses to the first of said units, and means connected between an anode of the last of said units and predetermined control grids of a preceding pair of said units for rendering said pair of units unresponsive to the pulse immediately following the pulse by which current is transferred to said anode.

6. A counter including first, second, third and fourth units each having input and output terminals and each including a pair of electron discharge elements having anode, cathode and grid electrodes, each of said pair of electron discharge elements having their anodes and grids cross connected so that current is conducted by either one or the other of said elements; means coupling the output terminals of the first, second and third of said units respectively to the input terminals of said second, third and fourth units; means coupled to the first of said units for applying input pulses only to the first of said units; a feedback connection between the fourth and third of said units; and a feedback connection between the third and second of said units, said feedback connections being such that one pulse is delivered at the output terminals of said fourth unit in response to ten of said input pulses.

7. A counter including first, second, third and fourth units each having input and output terminals and each including a pair of electron discharge elements having anode, cathode and grid electrodes, each of said pair of electron discharge elements having their anodes and grids cross connected so that current is conducted by either one or the other of said elements; means coupling the output terminals of the first, second and third of said units respectively to the input terminals of said second, third and fourth units; means coupled to the first of said units for applying input pulses only to the first of said units; a feedback connection between the fourth and third of said units; a feedback connection between the third and second of said units, said feedback connections being such that one pulse is delivered at the output terminals of said fourth unit in response to ten of said input pulses; and means interconnecting the output terminals of said units for indicating on a decimal scale of ten the number of said input pulses.

8. The combination of four trigger units each including a pair of electron discharge elements having anode, cathode and grid electrodes, the grids and anodes of each pair of electron discharge elements being cross-connected, means connecting said units in cascade to provide operation of said units except a first of said units by an immediately preceding unit, means coupled to a first one of said units for applying voltage pulses to said first one of said units, and means to couple certain ones of the last three of said units to apply to the second and third of said cascaded units reset pulses during the application of ten voltage pulses to the first one of said units to provide a cycle of operation which is completed in response to ten of said voltage pulses being applied to said first one of said units.

9. The combination of four trigger units each including a pair of electron discharge elements, each of said electron discharge elements having anode, cathode and grid electrodes, the grids and anodes of each pair of electron discharge elements being cross-connected, means connecting said units in cascade to provide operation of each of said units except a first of said units by an immediately preceding unit, means coupled to said first one of said units for applying voltage pulses to said first one of said units, and feedback means connected between subsequent ones of said last three units in said cascade and preceding ones of said last three units in said cascade to apply reset pulses during the application of ten voltage pulses to said first one of said units to provide a cycle of operation wherein one output pulse is delivered by the last one of said units in response to ten voltage pulses being applied to said first one of said units.

10. A counter including first, second, third and fourth units each having input and output terminals and each including a pair of electron discharge elements having anode, cathode and grid electrodes, each of said pair of electron discharge elements having their anodes and grids cross-connected so that current is conducted by either one or the other of said elements and operation of one of said units to transfer current conduction from one to the other of its elements is effectuated by application of a pulse to said unit input terminal, means coupling the output terminals of the first, second and third of said units respectively to the input terminals of said second, third and fourth units; means coupled to the first of said units for applying input pulses only to the first of said units; and a pair of feedback circuits each connected between a different pair of the last three of said units, each of said feedback circuits in each pair of said units connecting an anode of one of said pair of units to a grid of the other of said pair of units to operate said other of said pair of units when said one of said pair of units is operated for the first time from the preceding unit connected to its input terminals, said feedback circuit connections being such that only one pulse is delivered at the output terminals of said fourth unit in response to ten of said input pulses.

IGOR E. GROSDOFF.

(References on following page)

REFERENCES CITED

The following references are of record in the file of this patent:

UNITED STATES PATENTS

| Number | Name | Date |
|---|---|---|
| 2,306,386 | Hollywood | Dec. 29, 1942 |
| 2,342,753 | Pearson et al. | Feb. 29, 1944 |
| 2,381,920 | Miller | Aug. 14, 1945 |
| 2,407,320 | Miller | Sept. 10, 1946 |

| Number | Name | Date |
|---|---|---|
| 2,410,156 | Flory | Oct. 29, 1946 |
| 2,422,698 | Miller | June 24, 1947 |

OTHER REFERENCES

Physical Review, vol 57, 1940, "New Vacuum Tube Sealing Circuits," by Lifschutz, pages 243, 244.

Electronics, June 1944, pp. 110 to 113, 358 and 360: "A Four-Tube Counter Decade," by John T. Potter.